L. C. VAN PATTEN AND J. B. WOLFE.
ROTARY ROD WEEDER.
APPLICATION FILED SEPT. 9, 1920.
1,375,871.
Patented Apr. 26, 1921.
3 SHEETS—SHEET 1.
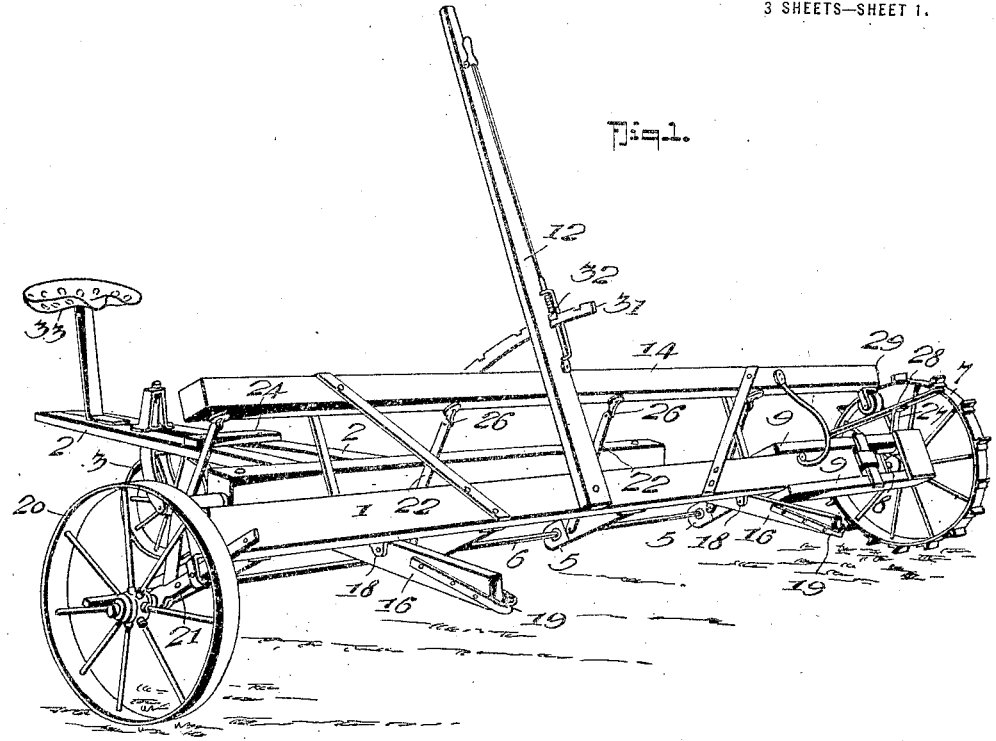
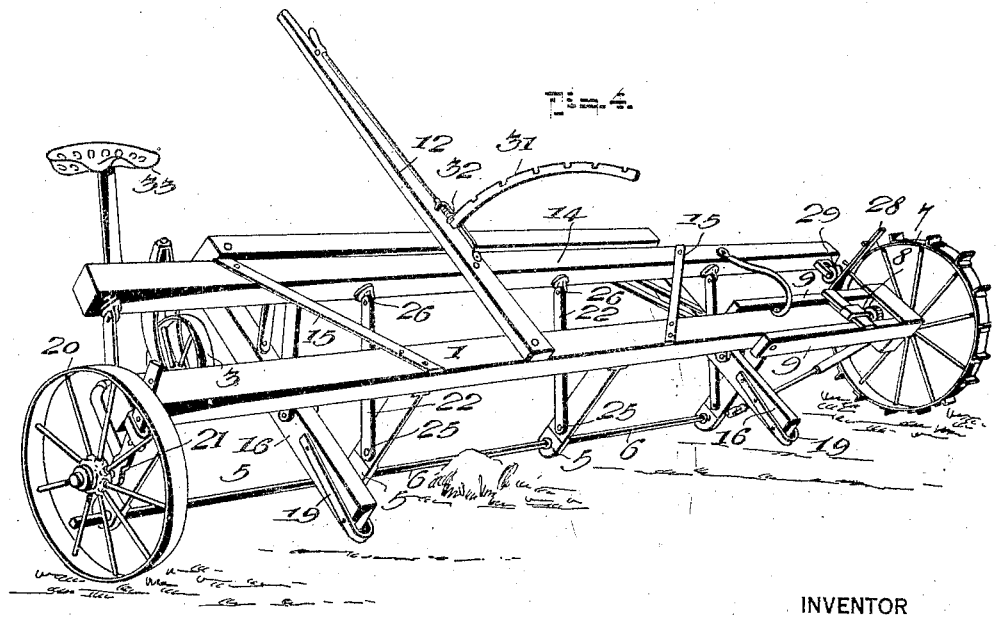
INVENTOR
Louis C. Van Patten,
Joe B. Wolfe.
BY
Fred G. Dieterich
ATTORNEYS

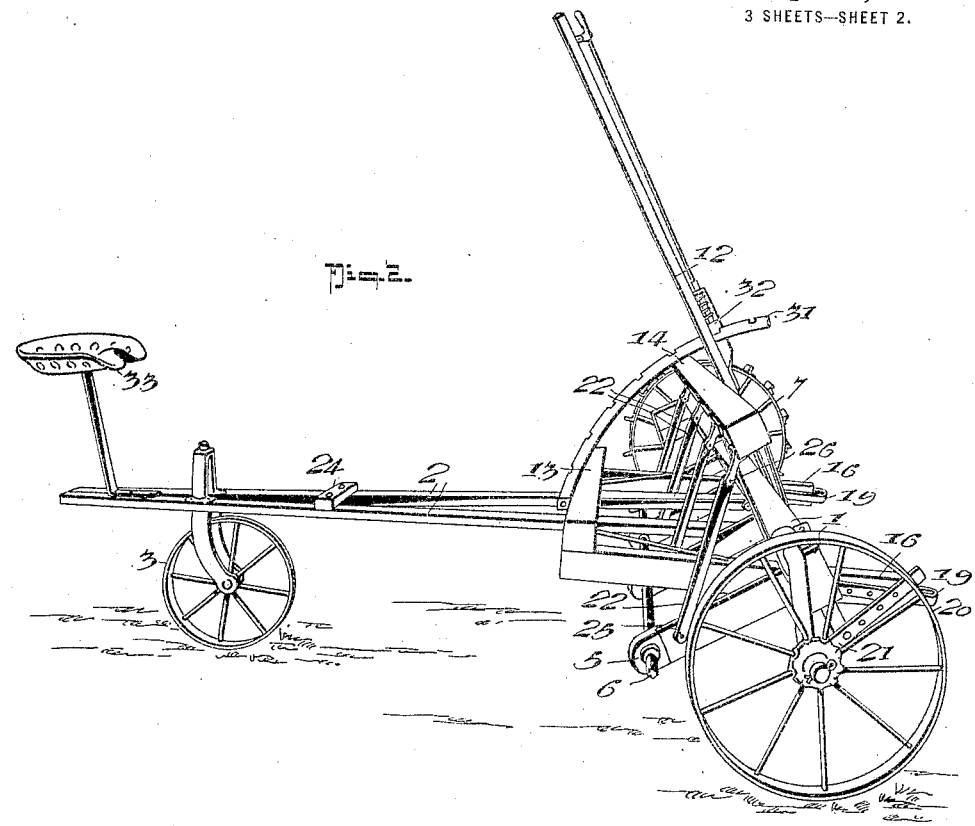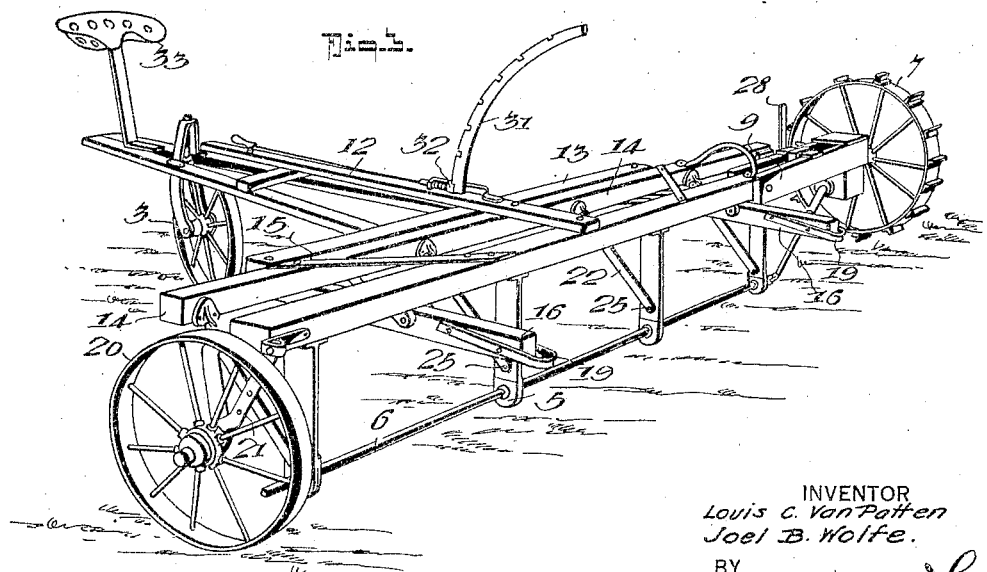

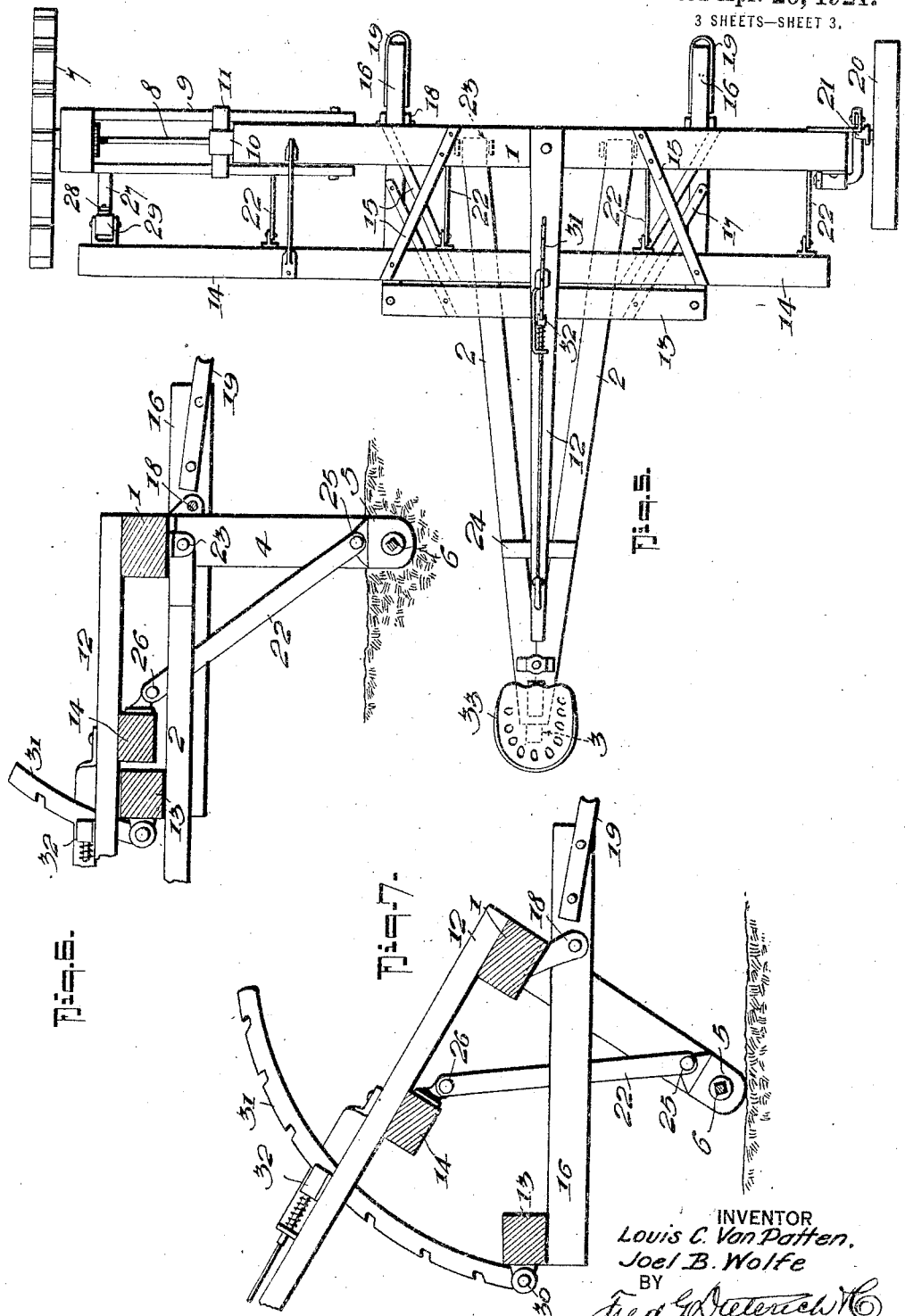

UNITED STATES PATENT OFFICE.

LOUIS C. VAN PATTEN AND JOEL B. WOLFE, OF CHENEY, WASHINGTON, ASSIGNORS TO ROTARY ROD WEEDER AND MANUFACTURING COMPANY, INCORPORATED, OF CHENEY, WASHINGTON.

ROTARY-ROD WEEDER.

1,375,871.   Specification of Letters Patent.   Patented Apr. 26, 1921.

Application filed September 9, 1920. Serial No. 409,094.

*To all whom it may concern:*

Be it known that we, LOUIS C. VAN PATTEN and JOEL B. WOLFE, citizens of the United States, residing at Cheney, in the county of Spokane and State of Washington, have invented certain new and useful Improvements in Rotary-Rod Weeders, of which the following is a specification.

This invention is a modification and improvement on that rotary rod weeder constituting the specific embodiment of the invention disclosed in our copending application filed May 8, 1920, Serial No. 379,859, and the present invention primarily has for its object to provide a weeder embodying the advantageous features of our former weeder aforesaid with more adequate and easily operated means whereby the hitch may be so balanced that the tilting lever will not need to be fastened down but will stay down without fastening, yet when the rod or shoe strikes a rock or other non-yielding obstruction, the resistance caused thereby will be sufficient to lift the lever until the obstruction is passed and then the rod and lever will assume their proper places; another object is to provide means whereby the parts may be quickly and conveniently adjusted so as to vary the depth of penetration of the rod to meet varying conditions of operation and yet maintain the proper balancing of the hitch with relation to the resistance encountered.

The present invention in its detail nature provides for the location of the hitch bar behind the main beam to which hitch bar the draft bars are rigidly secured, the latter being hinged to the main beam of the frame to which main beam, and to the auxiliary cross beam that is located preferably between the hitch bar and the main beam, the lifting lever is rigidly secured, the tiller being hinged to the main beam as in the form of our invention set forth in our application aforesaid; there is also provided means whereby draft bars, which are secured to the hitch bar may be held at different angles with relation to the lifting lever so as to adjust the penetration of the rotary rod beneath the surface of the ground according to the desire of the operator and also to make provision whereby the rotary rod may be held entirely out of the ground during transportation of the machine from place to place in an inoperative condition.

The invention furthermore resides in those novel features of construction, combination and arrangement of parts, all of which will be first fully described, then be specifically pointed out in the appended claims and illustrated in the accompanying drawings, in which:

Figure 1 is a perspective view showing the position of the parts when the machine is to be transported over the ground in an inoperative position.

Fig. 2 is another perspective view of the machine the parts being in the position shown in Fig. 1.

Fig. 3 is a perspective view showing the position of the parts when ready for operation.

Fig. 4 is a perspective view showing the operation of the machine when a fixed obstruction is encountered by the rotary rod.

Fig. 5 is a top plan view of the machine, the parts being in the position shown in Fig. 2.

Fig. 6 is an enlarged detail section, the parts being in the operative position.

Fig. 7 is a similar view showing the parts adjusted to a position where the rotary rod will be raised out of the ground.

In the drawings, in which like numerals and letters of reference indicate like parts in all of the figures, 1 represents the main beam from which the standards 4 project in the usual manner, and the standards 4 have the usual bearing shoes 5 for the rotatable rod 6 which is driven by the traction wheel 7 through the usual transmission shaft 8, as has heretofore been the practice. The traction wheel 7 is carried by the hinged frame 9 which forms an end extension of the beam 1 and is held against elevation above the beam 1 when transporting the machine by cleats 11 passing through apertured members 10 or in any other suitable way.

12 is the lifting lever which is secured rigidly to the beam 1 and to the auxiliary cross bar 14 which lies to the rear of the beam 1 and is rigidly secured to the beam 1 by suitable braces 15.

The main beam 1, the auxiliary beam 14, the lifting lever 12 and the braces 15 constitute a rigid frame.

The tiller frame 2 which carries the tiller wheel 3 and the seat 33 (when a seat is used) consist of bars diverging from the wheel 3 forwardly and they are hingedly secured at 23 to the lower side of the beam 1. The bars of the tiller frame preferably lie under the hitch bar 13 and the beam 1.

The longitudinal draft bars 16 are provided with clevises 19 to which the traction engine or team may be hitched in the usual way.

The hitch bar 13 and longitudinal draft bars 16 are braced by suitable braces 17 and they are hinged at 18 to the main beam 1 as best shown in Figs. 6 and 7 of the drawings.

An additional wheel 20 is mounted on an adjustable bracket 21 that is secured to the beam 1 at the end opposite to that to which the traction wheel 7 is connected. By adjusting the position of the wheel 20 through the medium of its bracket the depth of penetration of the rod 6 can be regulated to a nicety.

In order to transmit the draft thrust to the standards 4 at their lower ends and to brace the standards, rearwardly extending diagonal braces 22 are provided which are connected at 25 to the bearing shoes 5 and at 26 to a fixture on the auxiliary beam 14.

A brace 24 connects the diverging bars 2 of the tiller and on which the tilting lever 12 may rest.

A bracket 27 is fastened to the rear of the drive frame or head 9, a vertical piece of steel 28 forming the face of the bracket and pressing against a roller 29 fastened to the front side of the auxiliary beam 14. This arrangement allows the drive head to play up and down, according to the condition of the ground over which it goes and yet it cannot get out of position so as to bind on the main beam. By shimming up the roller bracket 29 the necessary adjustment can be made so as to keep the head 9 free from binding contact with the end of the beam to which it is pivoted according to the need of the situation.

An arc bar 31 is secured at 30 to the hitch bar 13 and coöperating with a latch device 32 on the lifting lever 12 whereby the depth of penetration of the rod 6 in the ground may be regulated, and whereby the balancing of the hitch may be adjusted to suit the conditions met with in practice.

It will thus be seen that by the present construction, the line of draft lies horizontally close to the hinge axis 23 (as in our previous apparatus referred to in the application aforesaid) but slightly above the same, the draft thrust being transmitted downwardly and forwardly through the diagonal braces 22 to the lower ends of the standards 4, since the lifting lever 12 is locked to the hitch bar 13 through the medium of the latch 32 and arc bar 31. As the lever 12 lies slightly above the axis of the hinge 23 and as the line of draft is slightly below the axis of the hinge 23, the draft pull on the vehicle tends to hold the hitch bar 13 down against the tiller frame. The resistance of the travel of the rod through the ground, however, tends to raise the lever 12. By locating the line of draft close to the horizontal plane containing the pivotal axis 23 and at a proper distance therefrom the downward pull on the lever 12, due to the force acting along the line of draft, may be very nearly counterbalanced by the resisting forces encountered by the rotary rod in passing through the soil. By our present arrangement, when it is desired to raise the rod out of the ground it is only necessary to release the latch 32 from the arc bar 31 during the forward draft of the machine. The resistance of the rod in the ground will cause it to swing on the pivot 23 to the position indicated in Fig. 7 and thus bring the rod up out of the ground where it may be locked by the latch 32. Furthermore, by our present construction it is possible to change the position of the rod with relation to the depth of penetration by moving the lever 12 on the pivot 23 and latching it at different angles with relation to the draft bars 16, thus enabling the draft bars 16 to always be kept in the horizontal position during the normal operation of the machine regardless of the depth of penetration to which the rotary rod has been set.

While the attached drawings illustrate the preferred embodiment of the invention it is to be understood that changes in the details of construction, combination and arrangement of the parts may be made without departing from the spirit of the invention or the scope of the appended claims.

What we claim is:

1. In rotary rod weeders, a main beam, rod bearing standards carried thereby, a tiller frame hinged to the main beam and projecting rearwardly thereof and carrying a tiller wheel, a hitch bar at the rear of said beam, draft bars extending forwardly of the hitch bar and hinged to the main beam, a lifting lever secured to the main beam and connected with the hitch bar substantially as shown and described.

2. In rotary rod weeders wherein is provided a main beam carrying the rod bearing standards in which the rotary rod is located and carrying the rotary rod driving mechanism and a tiller frame hinged to the main beam; a hitch bar located to the rear of the main beam, draft members connected to the hitch bar and projecting forwardly of the main beam and hinged thereto, and a lifting lever secured to the main beam.

3. In rotary rod weeders wherein is provided a main beam carrying the rod bearing standards in which the rotary rod is located and carrying the rotary rod driving mechanism and a tiller frame hinged to the main beam; a hitch bar located to the rear of the main beam, draft members connected to the hitch bar and projecting forwardly of the main beam and hinged thereto, a lifting lever secured to the main beam and adjustably connected with the hitch bar.

4. In rotary rod weeders wherein is provided a main beam carrying the rod bearing standards in which the rotary rod is located and carrying the rotary rod drive mechanism and wherein is provided a tiller frame hinged to the main beam; a hitch bar located to the rear of the main beam, draft bars secured to the hitch bars and projecting forwardly of the main beam, means hinging said draft bars to said main beam, an auxiliary beam lying to the rear of the main beam, braces connecting the main and auxiliary beams, braces connecting the auxiliary beam with the bearing standards, and a lifting lever secured to the main and auxiliary beams.

5. In rotary rod weeders wherein is provided a main beam carrying the rod bearing standards in which the rotary rod is located and carrying the rotary rod drive mechanism and wherein is provided a tiller frame hinged to the main beam; a hitch bar located to the rear of the main beam, draft bars secured to the hitch bars and projecting forwardly of the main beam, means hinging said draft bars to said main beam, an auxiliary beam lying to the rear of the main beam, braces connecting the main and auxiliary beams, braces connecting the auxiliary beam with the bearing standards, a lifting lever secured to the main and auxiliary beams and adjustably connected with the hitch bar.

6. In rotary rod weeders wherein is provided a main beam carrying the rod bearing standards in which the rotary rod is located and carrying the rotary rod driving mechanism and wherein is provided a tiller frame hinged to the main beam; a hitch bar over-lying the tiller frame to the rear of the main beam, longitudinal draft bars secured to the hitch bar and underlying the main beam and hinged thereto, a lifting lever secured to the main beam, an arc bar secured to the hitch bar and latch devices on the lifting lever coöperating with the arc bar for adjustably connecting the same together.

7. In rotary rod weeders wherein is provided a main beam carrying the rod bearing standards in which the rotary rod is located and carrying the rotary rod driving mechanism and wherein is provided a tiller frame hinged to the main beam; a hitch bar over-lying the tiller frame to the rear of the main beam, longitudinal draft bars secured to the hitch bar and underlying the main beam and hinged thereto, a lifting lever secured to the main beam, an arc bar secured to the hitch bar, latch devices on the lifting lever coöperating with the arc bar for adjustably connecting the same together, an auxiliary beam over-lying the tiller frame and located between the main beam and the hitch bar, means securing the main and auxiliary beams together and braces connecting the auxiliary beam with the standards substantially as shown and described.

LOUIS C. VAN PATTEN.
JOEL B. WOLFE.